G. H. WALDIN.
Chuck for Watch Makers' Lathes.
No. 23,050.
Patented Feb. 22, 1859.
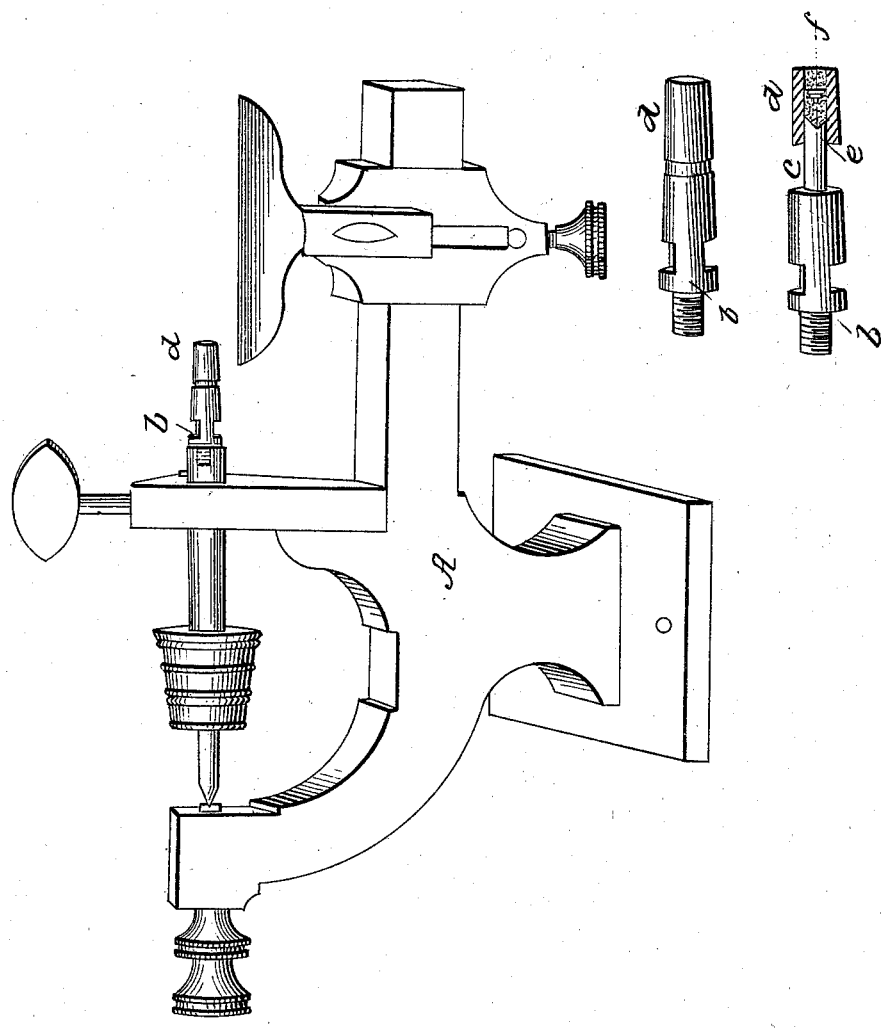

UNITED STATES PATENT OFFICE.

G. H. WALDIN, OF BURLINGTON, IOWA.

CHUCK FOR WATCHMAKERS' LATHES.

Specification of Letters Patent No. 23,050, dated February 22, 1859.

*To all whom it may concern:*

Be it known that I, G. H. WALDIN, of Burlington, in the county of Des Moines and State of Iowa, have invented a new and improved mode of turning and polishing wheels, staffs, cylinders, verges, pinions, pivots, and other similar articles of a delicate nature used in making and repairing watches and for other like purposes; and I do hereby declare that the following is a full and exact description thereof, reference being had to the accompanying drawings and to the letters of reference marked thereon.

To enable others who are skilled in the art of turning the machinery used in watchmaking to make and use my invention, I will proceed to describe its exact character and manner of operation.

I take a common Swiss jeweling lathe represented in the drawing by the letter A. To this I attach a chuck $b$ of a peculiar construction. This chuck has on its outer extremity a small cylindrical core or spindle $c$, over which slides the accurately fitting cylindrical thimble $d$. The length of the thimble and spindle can be made greater or less according to the length of the article intended to be turned. Upon the outer end of this spindle is a conical depression $e$ having its apex in the axis of rotation whenever the lathe is set in motion.

Whenever I wish to turn any article I extend the thimble by sliding it outward along the spindle $c$ the desired distance. I then fill the external cavity thus produced with melted sealing wax or other equivalent substance. Then inserting the shaft of the article to be turned I press it down gently with the finger until its interior pivot slides down into the apex of the conical cavity which is on the end of the spindle $c$. That pivot will then be in the exact axis of rotation. The workman then places his finger upon the external pivot $f$, and with a practiced hand and eye will, by setting the lathe in motion, readily place that pivot also in the exact axis of rotation by which time the sealing wax will probably have cooled sufficiently to hold it fixed in that position. The whole is then permitted to cool sufficiently to hold the article firmly when the turning or polishing is to be performed with the ordinary implements. If a wheel or balance is to be turned it is of course left outside of the thimble. After the work is completed the blaze of spirit lamp is applied to the thimble which at once liquefies the sealing wax so as to permit the article to be removed from the machine.

The method heretofore in use for turning these delicate articles is to place them in a lathe which requires the exertion of a considerable end pressure upon the shaft of the article to be turned in order to hold it in its proper position. When the shaft is slender this end pressure, together with the side pressure necessarily exerted by the turning chisel is often productive of great injury. Besides, the turning and finishing of the pivot itself is a matter of great difficulty when done in the ordinary way. Both these difficulties are entirely overcome by the process above described, which will be found entirely successful.

What I claim by my invention, and desire to secure by Letters Patent is—

The use of the cylindrical core or spindle $c$, in connection with the thimble $d$, for containing sealing wax or its equivalent, the whole constructed and operated as specified.

G. H. WALDIN.

Attest:
LYMAN COOK,
JOHN N. BAXTER.